Figure 3:
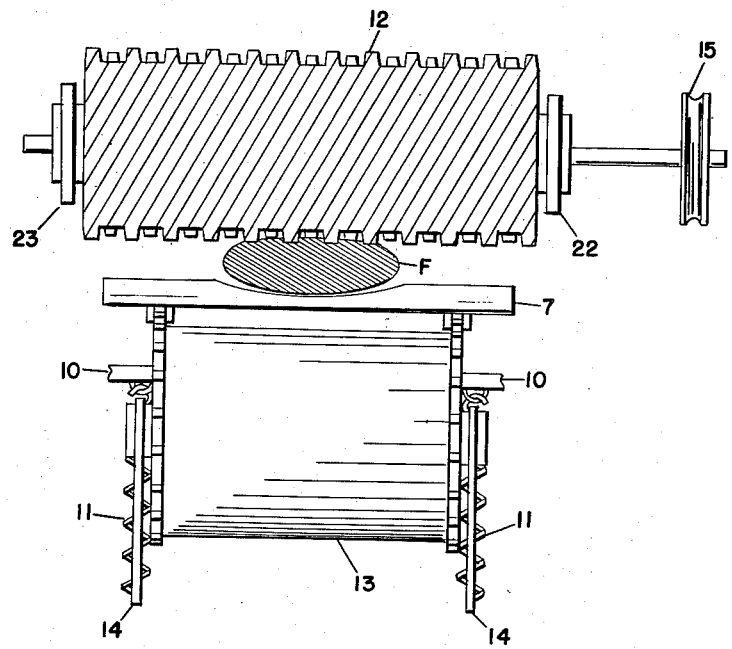

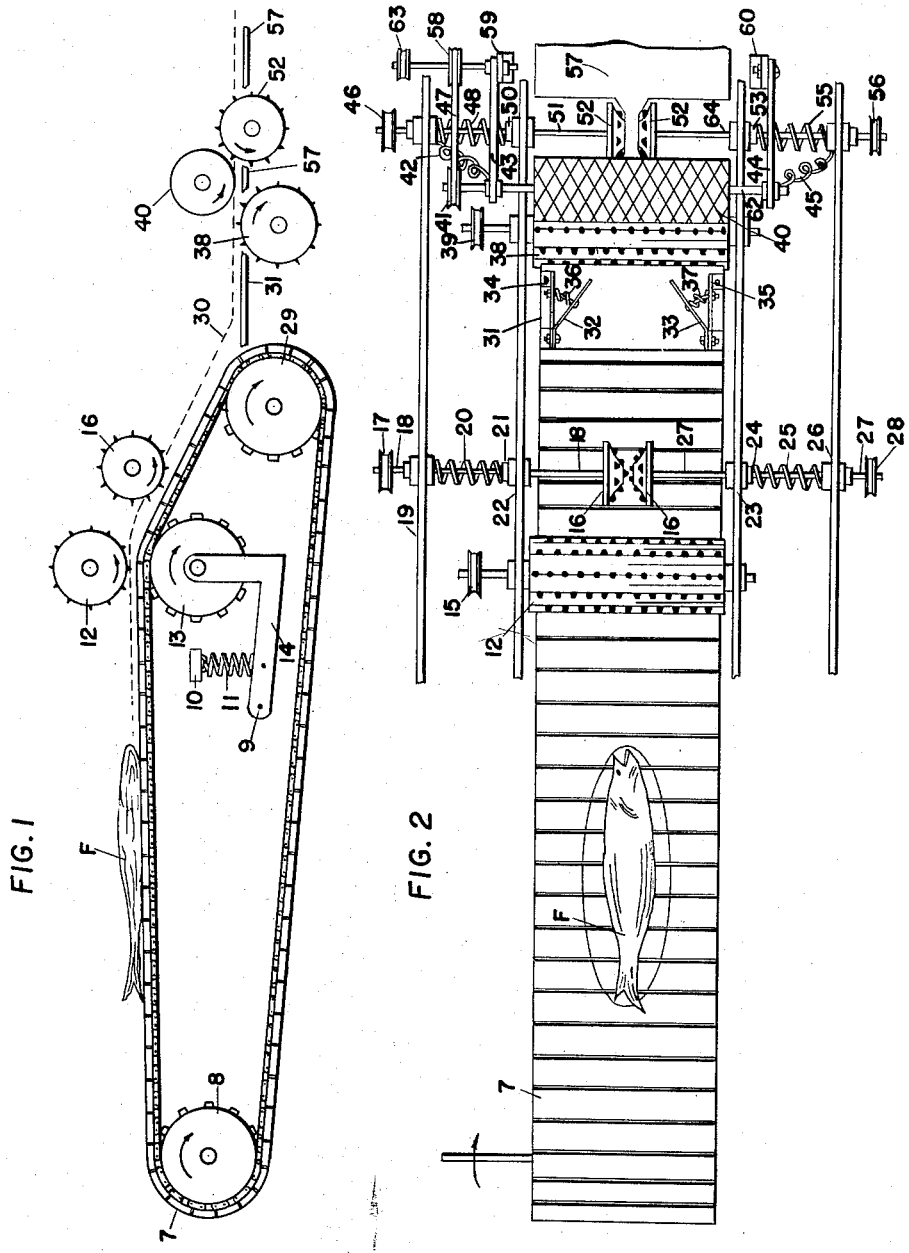

March 1, 1955    L. E. THIBODEAU    2,702,922
FISH SCALING APPARATUS
Filed June 7, 1952    3 Sheets-Sheet 2

INVENTOR
L.E. THIBODEAU
BY
*G.H. Douvas*
ATTORNEY

March 1, 1955

L. E. THIBODEAU 2,702,922

FISH SCALING APPARATUS

Filed June 7, 1952

3 Sheets-Sheet 3

INVENTOR
L. E. THIBODEAU

BY
*G. G. Douvas*
ATTORNEY

United States Patent Office 2,702,922
Patented Mar. 1, 1955

2,702,922

FISH SCALING APPARATUS

Leo E. Thibodeau, Worcester, Mass.

Application June 7, 1952, Serial No. 292,250

3 Claims. (Cl. 17—5)

This invention relates to new and improved apparatus for cleaning fish, and particularly to apparatus for mechanically scaling fish.

A principal object of this invention is to improve apparatus for scaling fish whereby not only the side portions of said fish but also the ventral and dorsal portions thereof are thoroughly cleansed of scales.

Another object of this invention is to completely eliminate the use of manual procedures in scaling fish and to utilize in lieu thereof automatically operated means whereby said fish are reliably and thoroughly scaled without supervision.

Another object of this invention is to minimize the time and expense involved in scaling fish.

Another object of this invention is to provide fish scaling apparatus which is universally adaptable to process fish within reasonable weight and size variations.

Another object of this invention is to improve the mechanical reliability of fish scaling apparatus.

Although there exist in the prior art a large variety of fish scaling apparatus, substantially all of these devices are subject to one or more major defects. Perhaps the most common type of fish scaling apparatus utilized in fish processing plants is the rotary knife scaler which is manuallly rolled over the side, ventral and dorsal portions of a fish at the will of the operator. While it is quite possible for an operator to thoroughly clean a particular fish by passing the rotary knife of this apparatus over all external portions of the fish, in the usual instance, the operator in trying to establish a relatively high work rate will neglect to thoroughly clean the ventral and dorsal portions of the fish. This is in part due to the fact that scaling apparatus cannot be made to conform easily to the relatively large curvatures of the ventral and dorsal fish portions without the application of a large manual pressure to the scaling apparatus. Furthermore, while it is sometimes said that the time consumed in manually scaling fish with the aforementioned type of scaling apparatus is relatively small, this statement in a large measure overlooks the human element involved whereby the tiredness of the operator after a relatively short work time reduces the work day average to a substantially lower figure than that resulting from a short working period.

Accordingly, from time to time in the prior art attempts have been made to devise completely practical and fully automatic fish scaling apparatus. While some types of this apparatus have functioned in an entirely workable manner, the scaling of the ventral and dorsal portions of the fish was far from satisfactory. This was due in part to the relative difficulty in providing a universal structure which was capable of scaling the ventral and dorsal portions of fish of all sizes, shapes and weights.

Accordingly, it is a feature of the preferred embodiment of this invention to utilize four scraper units each having scaling teeth upon the individual scrapers thereof so as to scale successively particular portions of the fish undergoing processing. In particular, the fish to be processed are placed upon a conventional type conveyor belt whereby the top side portion of said fish are caused initially to pass sequentially under the scaling teeth of a top scraper. Compression is applied to the fish when passing under this top scraper by a spring mechanism attached to a sprocket wheel which guides and supports the conveyor belt.

Each of said fish thereafter progressively passes between a set of tapered, top ventral and dorsal scrapers having scaling teeth thereon whereby the upper ventral and dorsal portions of said fish are scaled. This set of top scrapers is spring loaded so that the contour of the taper thereof mates with the upper ventral and dorsal surfaces of the fish being processed. The compression applied by the spring force assures the thoroughness of the ventral and dorsal scaling.

Thereafter, said fish are passed over a bottom scraper having substantially the same construction as the aforementioned top scraper. This bottom scraper thoroughly scales the remaining side portion of the fish under process. A compression force is applied to the fish in this step by an accommodating overhead drive roller.

In the final step, each fish is passed between a second set of tapered, bottom ventral and dorsal scrapers which scale the lower ventral and dorsal fish portions. This set of bottom scrapers is substantially identical in construction to the aforementioned set of top ventral and dorsal scrapers, and is likewise spring loaded so that a compression force is applied to the lower ventral and dorsal fish portions.

With this complete operation, the top and bottom side portions of the fish are cleaned by the top and bottom scrapers, respectively. The upper ventral and dorsal portions of the fish are scaled by the set of top ventral and dorsal scrapers, and the lower ventral and dorsal portions of said fish are cleaned by the set of bottom ventral and dorsal scrapers whereby each fish is thoroughly scaled.

The adaptability of the aforementioned apparatus to scale fish of varying sizes follows from the relative accommodation movements provided for all of the scraper units. In particular, the conveyor belt is moved forcibly downward relative to the top scraper in an amount determined by the particular thickness of the fish conveyed under the top scraper. Secondly, the top ventral and dorsal scrapers are forcibly separated from one another in an amount determined by the breadth of the fish passing therebetween. Thirdly, the overhead drive roller is moved forcibly upward relative to the bottom scraper in an amount determined by the thickness of the fish driven under the bottom scraper. Fourthly, the bottom ventral and dorsal scrapers are made to accommodate to the lower ventral and dorsal breadth of a particular fish in a manner substantially identical to the accommodation of the top ventral and dorsal scrapers.

Figure 4:
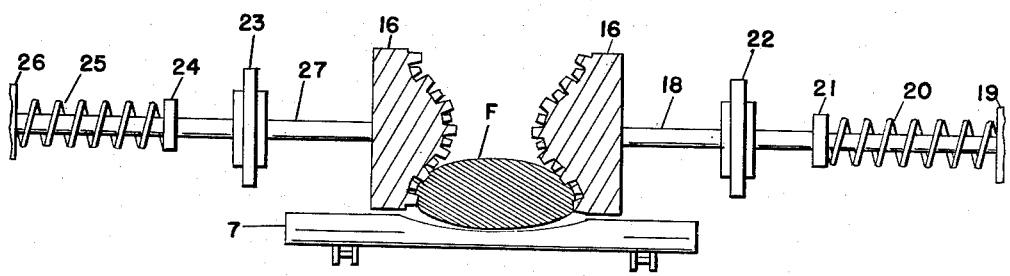
Figure 5:
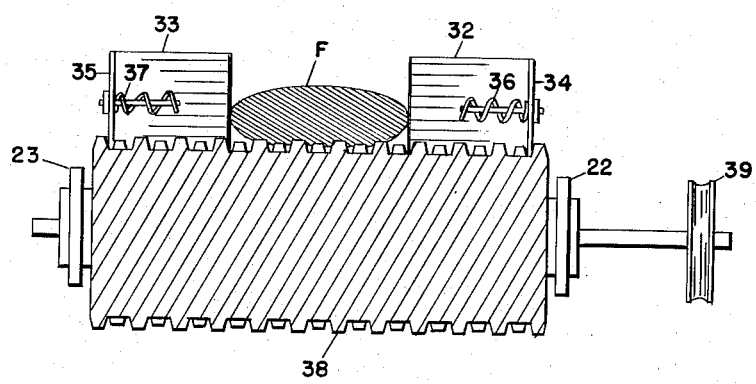
Figure 6:
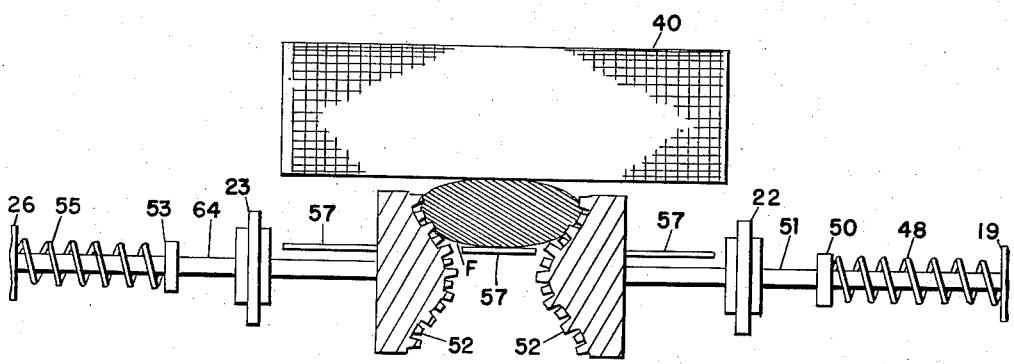

In order that all of the features and objects of this invention may be readily understood, a detailed description follows hereinafter with particular reference being made to the drawings wherein:

Fig. 1 is a simplified diagrammatic view of a preferred embodiment of this invention showing the relative positions and the direction of rotation of the scrapers, sprocket wheels, and overhead drive roller, Fig. 2 is a detailed plan view of a preferred embodiment of this invention constructed in accordance with the diagrammatic view of Fig. 1, Fig. 3 is an elevation view showing a fish under process in section under the top scraper which is also shown in section, Fig. 4 is an elevation view showing a fish under process in section with the top ventral and dorsal scrapers being applied thereto, said scrapers also being shown in section, Fig. 5 is a side elevation view showing a fish under process in section directly above the bottom scraper which is also shown in section, and Fig. 6 is a side elevation view showing a fish under process in section and having the bottom ventral and dorsal scrapers applied thereto, said scrapers also being shown in section.

Referring now principally to Figs. 1 and 2, fish F is positioned side down upon conveyor belt 7 so that the ventral and dorsal portions of the fish are generally parallel to the sides of the conveyor belt. As is shown in Fig. 2, fish F is advantageously positioned within an elliptical groove formed upon the belt segments so that a defined position is prescribed for each fish relative to the conveyor belt.

Conveyor belt 7 is rotated in a generally clockwise direction by a rotary force applied to drive sprocket 8. Sprockets 13 and 29 are passive in the sense that no driving force is applied thereto other than that by conveyor belt 7. Both sprockets 13 and 29 rotate in a clockwise direction as shown by the arrows.

The support shaft for sprocket 13 is mechanically coupled at both ends thereof to a pair of elbow pieces 14. Each of elbow pieces 14 pivot about an individual fixed point 9. An individual spring 11 interconnects each elbow piece 14 and stationary support 10 whereby sprocket 13 and conveyor belt 7 can be made to accommodate for the passing of fish F under top scraper 12.

In a preferred embodiment, top scraper 12 is closely positioned to the immediate portions of conveyor belt 7 so that fish F cannot pass therebetween unless sprocket 13 undergoes a downward accommodation movement. The continual force applied to sprocket 13 by spring 11 assures that the top side portion of fish F mates closely with the teeth located upon the periphery of top scraper 12. It should be noted that top scraper 12 is rotated in a counterclockwise manner by a force applied to pulley 15 so that the forward motion of fish F is not impeded by the scaling teeth of the scraper.

Fish F proceeds in a path indicated by dotted line 30 after having passed under top scraper 12.

In the second step, fish F is fed into the set of top ventral and dorsal scrapers 16 whereby the top ventral and dorsal portions are thoroughly scaled. As is shown in the plan view of Fig. 2, the set of top ventral and dorsal scrapers comprises two tapered members each having scaling teeth projecting therefrom. Each of these tapered members receives a rotary force through shafts 18 and 27 applied to pulleys 17 and 28, respectively. Each of shafts 18 and 27 are slidable with respect to support pieces 19, 22, 23, and 26. Stop pieces 21 and 24 are permanently fixed relative to shafts 18 and 27 whereby the passing of fish F between the normally close spacing of each of the set of top ventral and dorsal scrapers 17 cause an outward accommodation movement of each side scraper in accordance with the breadth of fish F. Springs 30 and 31 are thereby compressed to provide for the close mating of each of the top ventral and dorsal scrapers to the ventral and dorsal contours of fish F. Both of these scrapers rotate in a counterclockwise direction so that the progress of fish F is not impeded by forces applied through the scaling teeth.

The downward slope of the right portion of conveyor belt 7 causes fish F to slide upon and over plate 31 into the scaling teeth of bottom scraper 38. Two accommodating guide pieces, 32 and 33, are individually mounted on each end of plate 31 so that fish F is centered to the middle portion of plate 31 when passing to the right edge thereof and into the scaling teeth of bottom scraper 38. In particular, guide pieces 32 and 33 are hinge mounted with respect to support brackets 34 and 35 so that the degree of compression of springs 36 and 37 determine the angles formed by each guide piece and its support bracket.

After the center positioning of fish F by guide pieces 32 and 33, said fish passes above bottom scraper 38 whereby the bottom side portion of fish F is thoroughly scaled. Bottom scraper 38 is rotated in a clockwise direction by a rotary force applied to pulley 39. The direction of this force assures the continued and progressive movement of fish F throughout the scaling apparatus of this invention.

Overhead drive roller 40 applies a compression force to the top side surfaces of fish F so that said fish mates closely with the scaling teeth of bottom scraper 38. It should be noted that overhead drive roller 40 rotates in a counterclockwise direction whereby a forward motion is applied to fish F. Drive roller 40 is pivotally mounted with respect to stationary support brackets 59 and 60 so that said roller may follow a circular movement with respect to said support brackets which is defined by arms 43 and 44. Springs 42 and 45 couple shaft 62 of said drive roller to stationary support pieces 19 and 26, respectively, whereby a downward force is applied to said drive roller. A rotary force is applied to shaft 62 of the drive roller by means of cable belt 47 which couples pulley 58 to pulley 41. Pulley 58 is driven by a rotary force applied to pulley 63.

Because of the structural arrangement which permits the application of a rotary force to overhead drive roller 40 while at the same time allowing said drive roller to move up and down so as to accommodate for fish F passing thereunder, the thorough bottom side scaling of fish of varied sizes and weights is effectively attained.

In the fourth and final scaling step provided by the preferred embodiment of this invention, fish F passes upon plate 57 into the scaling teeth of a second set of bottom ventral and dorsal scrapers 52. The axis of these scrapers as defined by shafts 51 and 64 is located beneath the bottom side of fish F whereby the lower ventral and dorsal portions of said fish are scaled. Bottom ventral and dorsal scrapers 52 are constructed in a manner substantially identical to that of top ventral and dorsal scrapers 16 with the sideward accommodation movement for the latter set of scrapers being provided by springs 48 and 55. The compression force of each of these springs is applied to shafts 51 and 64 by stops 50 and 53, respectively, which stops are permanent relative to said shafts. Suitable rotary forces applied to pulleys 46 and 55 provide for the rotation of side scrapers 52. It should be noted that this set of scrapers is rotated in a counterclockwise direction so as to impede the forward progress of the fish undergoing processing, whereas, the direction of rotation of the other scrapers of this invention aid the forward progress of the fish undergoing processing. In particular, the counterclockwise rotation of bottom ventral and dorsal scrapers 52 is preferable in that it slows down the forward progress of fish F so that the bottom side can be thoroughly scaled by bottom scraper 38, and the lower ventral and dorsal portions can be thoroughly scaled by a relatively slow forward motion through scrapers 52.

The rotary driving forces applied to pulleys 15, 17, 28, 39, 46, 56, and 63 may be attained by any arrangement of driving means known in the mechanical art. The specific means or arrangement utilized in rotating the basic scraper sets is not of extreme importance and accordingly, other arrangements and means different from that suggested in Fig. 2 may be utilized without departing from the scope of this invention.

Fig. 3 shows in detail the application of the scaling teeth of top scraper 12 to the top side of fish F. Both the top scraper and fish are shown in section. Top scraper 12 is a solid metallic cylinder having metallic scaling teeth formed upon the cylindrical surface thereof. These teeth may be integral with the metallic body structure of cylinder 12 or they can also be constructed of resilient material such as rubber and applied to the outer surface of a cylinder so that the general scraper construction is substantially identical to the unitary structure shown in Fig. 3.

The set of springs 11 are placed under tension when fish F passes beneath top scraper 12. This tensioning causes the set of elbow pieces 14 to elevate sprocket 13 and inasmuch as conveyor belt 7 rests upon, and is guided by sprocket 13, fish F is compressed between top scraper 12 and conveyor belt 7 so that the scaling teeth mate closely with the top side of fish F. When fish F has passed from under scraper 12, the tensioning of the set of springs 11 is removed whereby elbow pieces 14 raise sprocket 13 so that conveyor belt 7 attains a position which is relatively close to the lowermost portion of top scraper 12. This normal spacing of conveyor belt 7 with respect to top scraper 12 should be sufficiently close so that the smallest size fish which will be processed by the apparatus of this invention will cause a sufficient downward accommodation movement of conveyor belt 7 so that said fish will be under compression.

Fig. 4 shows in detail the application of top ventral and dorsal scrapers 16 to the same fish F shown in Fig. 3. Inasmuch as the normal spacing of each of top side scrapers 16 is relatively close so that fish F cannot pass therebetween unless an outward accommodation movement is provided, said fish is compressed in a manner shown in Fig. 4. In particular, because stop pieces 21 and 24 are permanently fixed with respect to shafts 18 and 27, respectively, the increased spacing between the set of top ventral and dorsal side scrapers 16 causes said stops to compress their respective springs. The force applied to these stops by the springs assures that the scaling teeth located upon the operating surface of scraper 16 mate closely with the upper ventral and dorsal side portions of fish F. The rotary motions of side scraper 16 relative to fish F causes a tearing away of the fish scales which thoroughly cleans the upper ventral and dorsal fish portions.

Fig. 5 is a detailed view showing the application of bottom scraper 38 upon fish F in the third scaling step of the apparatus of this invention. Fish F is positioned upon the centermost portion of bottom scraper 38 by accommodating guide pieces 32 and 33. The force applied to these guide pieces by their respective guide springs 36 and 37 assures that fish F is guided properly.

As is shown in Figs. 1 and 2, a compression force is applied to fish F in this step of operation by means of overhead accommodation drive roller 40 which is not shown in this view. This force causes the bottom side portion of fish F to mate closely with the scaling teeth of bottom scraper 38 whereby the thoroughness of the bottom scaling is assured.

Fig. 6 shows the detailed application of the set of bottom ventral and dorsal scrapers 52 to fish F. Inasmuch as fish F is located above the horizontal axis of shafts 51 and 64, the scaling teeth of scrapers 52 effectively mate with the lower ventral and dorsal portions of fish F. It should be noted that overhead guide roller 40 assures that fish F mates closely with the scaling teeth of scrapers 52. Stop pieces 51 and 53 transmit the forces of compressed springs 48 and 55, respectively, to their respective shafts. Plate 57 supports fish F.

It should be understood that the description herein is directed to the preferred embodiment of this invention shown in the drawings, and that changes in the structure thereof may be made without departing from the spirit and scope of this invention.

What is claimed is:

1. A fish scaling apparatus comprising a flexible conveyor belt, sprocket wheels supporting the belt to provide an upper run presenting a broad, horizontal surface, an idler wheel mounted under the said upper run of the belt, a driven scraper mounted over and spaced from the said upper run of the belt at the portion thereof under which lies the idler wheel, the scraper being mounted for rotation about a horizontal axis extending transversely of the belt, resilient means for biasing the idler wheel upwardly against the said upper run of the belt, two driven tapered scrapers mounted with their axes in a plane which lies over and generally spaced from the upper run of the belt, each of the said scrapers having an axis of rotation which is horizontal and extends transversely of the belt, the portions of the scrapers of minimum diameter being adjacent one another, the scrapers being resiliently biased toward each other to accommodate to the central to dorsal breadth of the immediate portion of the fish carried therebetween.

2. A fish scaling apparatus comprising a flexible conveyor belt presenting a broad, horizontal upper surface, two spaced scrapers supported over the belt, each scraper being mounted on and driven by a horizontal shaft, each of said scrapers having a generally tapered cross-section in a plane passing through the axis of its shaft, the shafts having their axes in a generally horizontal plane and being slidably mounted for axial movement over the conveyor belt, the scrapers being mounted on the adjacent ends of the shafts with their portions of minimum diameter lying adjacent each other, the belt carrying the fish lying on its side between and past the scrapers so that the portions thereof immediately between said scrapers lies substantially between the axes of the shafts and the surface of the belt, and resilient means associated with the shafts for biasing the scrapers toward each other to accommodate to the central to dorsal breadth of the immediate portion of the fish carried therebetween under pressure between the fish and the scrapers.

3. A fish scraping apparatus as recited in claim 1, wherein is provided a rotatably-driven bottom side scraper positioned past the end portion of said conveyor belt, an upwardly-accommodating rotatably-driven roller positioned partially over said bottom side scraper, and a set of rotatably-driven outwardly-accommodating bottom central and dorsal scrapers positioning partially below and past said roller.

References Cited in the file of this patent

UNITED STATES PATENTS

| | | |
|---|---|---|
| 745,861 | Keller et al. | Dec. 1, 1903 |
| 1,394,711 | Carter | Oct. 25, 1921 |
| 1,692,985 | Gallison | Nov. 27, 1928 |
| 2,086,159 | Godfrey | July 6, 1937 |
| 2,345,607 | Kaplan | Apr. 4, 1944 |
| 2,599,694 | Christiansen | June 10, 1952 |